United States Patent
Russell et al.

(10) Patent No.: US 9,572,309 B2
(45) Date of Patent: Feb. 21, 2017

(54) ADJUSTABLE PLANTER DISK

(71) Applicant: Suncast Technologies, LLC, Palm Beach Gardens, FL (US)

(72) Inventors: Brian J. Russell, Aurora, IL (US); Michael R. Vogler, Oswego, IL (US); Michael Thuma, La Grange, IL (US)

(73) Assignee: Suncast Technologies, LLC, Palm Beach Gardens, FL (US)

( * ) Notice: Subject to any disclaimer, the term of this patent is extended or adjusted under 35 U.S.C. 154(b) by 264 days.

(21) Appl. No.: 14/311,997

(22) Filed: Jun. 23, 2014

(65) Prior Publication Data

US 2015/0366144 A1   Dec. 24, 2015

(51) Int. Cl.
*A01G 27/02* (2006.01)
*A01G 27/00* (2006.01)
*A01G 9/02* (2006.01)

(52) U.S. Cl.
CPC ............... *A01G 27/008* (2013.01); *A01G 9/02* (2013.01); *A01G 27/00* (2013.01); *A01G 27/02* (2013.01)

(58) Field of Classification Search
CPC ............ A01G 9/02; A01G 9/04; A01G 9/042; A01G 9/047; A01G 9/1073; A01G 27/00; A01G 27/02; A01G 27/04; A01G 27/06
USPC ............................ 47/65.6, 66.2, 80, 29.5, 32
See application file for complete search history.

(56) References Cited

U.S. PATENT DOCUMENTS

| | | | |
|---|---|---|---|
| 1,235,520 A * | 7/1917 | Kirfman | A01G 13/0243 47/32 |
| 2,055,844 A | 9/1936 | Kneller | |
| 2,238,132 A | 4/1941 | Ritter | |
| 2,253,817 A | 8/1941 | Simmons | |
| 2,484,909 A | 10/1949 | Ritter | |
| 2,999,479 A * | 9/1961 | Gault | A01G 13/105 119/174 |
| 3,147,569 A * | 9/1964 | Murguia | A01G 9/10 47/73 |
| 4,077,159 A | 3/1978 | Haglund | |
| 5,184,421 A * | 2/1993 | Meharg | A47G 7/07 47/21.1 |

(Continued)

FOREIGN PATENT DOCUMENTS

GB    2080084 A  *  2/1982  ............... A01G 9/02

OTHER PUBLICATIONS

Anonymous, "Discover how to have healther plants, bigger blooms, use less potting soil, and save time and money with Ups-A-Daisy planter inserts", Retrieved from the Internet, http://www.ups-a-daisy.com, (July 18, 2014).

*Primary Examiner* — Son T Nguyen
(74) *Attorney, Agent, or Firm* — McHale & Slavin, P.A.

(57) ABSTRACT

An adjustable planter disk comprised of a circular disk constructed of a single resin composite sheet is disclosed. The sheet has a first terminating end that overlaps, or partially overlaps, a second terminating end. The sheet includes a peripheral edge and center hole. The first terminating end rotates overtop the second terminating end and latches thereto using a pair of hooks on the first terminating end and a series of corresponding holes on the second terminating end to create differing radii. The sheet is divided into a plurality of sectors, each sector including a living hinge that runs from the peripheral edge to the center that allows for the first terminating end to extend and contract. Additionally, along the peripheral edge of the circular are a plurality of water drainage holes.

9 Claims, 5 Drawing Sheets

(56) References Cited

U.S. PATENT DOCUMENTS

| | | | |
|---|---|---|---|
| 5,279,069 A * | 1/1994 | Myer | A01G 13/0281 |
| | | | 47/32 |
| 5,315,783 A | 5/1994 | Peng | |
| 5,355,623 A * | 10/1994 | Brown | A01G 13/0281 |
| | | | 47/32 |
| D352,479 S | 11/1994 | Carlson | |
| D352,480 S | 11/1994 | Carlson | |
| 5,430,971 A * | 7/1995 | Myer | A01G 13/0281 |
| | | | 47/32 |
| 5,548,923 A * | 8/1996 | Myer | A01G 13/0281 |
| | | | 47/32 |
| D382,512 S | 8/1997 | Hulsebus | |
| D437,194 S * | 2/2001 | Rivas | D8/1 |
| 6,615,540 B1 | 9/2003 | Muller | |
| 7,024,818 B2 | 4/2006 | Maniscalco et al. | |
| 8,381,440 B1 * | 2/2013 | Jabs | A01G 13/0281 |
| | | | 47/29.5 |
| D741,220 S * | 10/2015 | Leppakorpi | D11/164 |
| 2003/0106262 A1 | 6/2003 | Lai | |
| 2004/0065010 A1 * | 4/2004 | Shannon | A01G 9/02 |
| | | | 47/65.6 |
| 2006/0150482 A1 * | 7/2006 | Delisse | A01G 31/02 |
| | | | 47/39 |
| 2008/0072481 A1 * | 3/2008 | Conrad | A01G 13/0281 |
| | | | 47/31.1 |
| 2009/0038220 A1 * | 2/2009 | Guthrie | A01G 9/028 |
| | | | 47/85 |

* cited by examiner

ADJUSTABLE PLANTER DISK

FIELD OF THE INVENTION

This invention is directed to the field of flower pot accessories, and more particularly to an adjustable planter disk for placement within a planter.

BACKGROUND OF THE INVENTION

Capillary action is the ability of a liquid to flow in narrow spaces without the assistance of, and in opposition to, external forces like gravity. Capillary action occurs because water is sticky, due to the forces of cohesion (water molecules stay close together) and adhesion (water molecules are attracted and stick to other substances). It is defined as the movement of water within the spaces of a porous material due to the forces of adhesion, cohesion, and surface tension.

Plants and trees couldn't thrive without capillary action; capillary action is important for moving water and all of the nutrients dissolved within it to the plant and throughout it. Plants grow roots into the soil which are capable of absorbing and carrying the water from the soil up into the plant. Water, which contains dissolved nutrients, once inside the roots is transferred throughout the plant tissue. As a first water molecule is transferred, it pulls along a second water molecule, which, of course, is dragging a third water molecule, and so on.

Modern urban living has led to a surge in the display of potted plants. Potted plants are commonly displayed in private homes, restaurants, hotels, and office buildings or the like to enhance the aesthetical beauty of the area. Consequently, devices for containing and caring for potted plants have become more sophisticated in an attempt to prolong the life and increase the growth of potted plants. A basic flower pot or planter is a container in which flowers and other plants are cultivated and displayed. The basic flower pot typically includes holes in the bottom surface of the flowerpot to allow excess water to flow out and into a saucer that is placed under the flowerpot. While most of the water that flows out of the flowerpot into the saucer is wasted, a small portion of the water in the saucer may be reabsorbed into the soil using capillary action for use by the plant.

One of the most desirable types of potted plant devices available is the self watering planter. Self watering planters are devices containing relatively large water or fluid reservoirs which may be periodically filled, which then dispense the water to the plant as the plant requires it. This construction provides extended periods where the plant owner does not need to water his/her plants on a daily basis. Self watering planters have been devised to operate by way of timer systems which control the operation of pumps, or by way of constant low volume seepage into the soil surrounding the plant through gravity. Another type of self watering planter is the type wherein a sensor is placed within the soil of the plant to sense the level of moisture in the soil and cause additional water to be delivered to the soil if the moisture level is too low. Sensing self watering planters of this type have utilized expensive and possibly dangerous electrical sensing units. Furthermore, roots of the plant are hydrotropic, so they tend to grow towards the source of water; thus the plant roots will grow down through the soil to the inlet port of the planter and foul or clog the port such that it does not operate properly. Another disadvantage of self watering planters from the prior art is that the tube connecting the sensor element to the water reservoir frequently extends above the level of the planter and is not aesthetically pleasing. This not only mars the beauty of the plant, but in public areas such as restaurants and hotel lobbies, frequently leads to the sensor being displaced or broken by passers-by or curious individuals.

Simpler solutions for containing and caring for potted plants exists, such as planter inserts. Planter inserts sit partially down the planter, raising the bottom of the container, thereby allowing for proper drainage and essential oxygen to access plant roots. This construction reduces the amount of soil required as most plants have a short root base, requiring only 6-8 inches of soil to thrive. Giving the roots too much room will cause the roots to spread too far and the excessive amount of soil may not drain properly. An additional advantage is provided by reducing the weight of large planters. Less soil will also mean the roots will be confined, forcing the nutrients back into the plants, thereby producing healthier plants with larger blooms. Planter inserts also provide an economical advantage over self-watering planters by eliminating complex electronic and mechanical devices. Planter inserts also allow the use of large decorative planters for plants that only require a small amount of soil for proper growth. Thus, what is lacking in the art is an adjustable planter disk for placement within a planter. The planter disk should be adjustable in diameter to provide a false bottom in various sized and shaped planter pots. The planter disk should be easy to adjust and should utilize fasteners that that can be operated by hand without the use of tools or excessive hand strength. The planter disk should be light weight and yet capable of supporting a substantial amount of soil within the planter. The planter disk should include apertures of sufficient size and shape to allow the plants roots to grow through the planter disk to reach a water reservoir positioned below the planter disk. The outside edge of the planter disk should cooperate with the sides of the planter to position the planter disk and support the load of the soil and plants. The planter disk should be constructed to increase force against the inner surface of the planter as the load on the planter disk is increased.

SUMMARY OF THE INVENTION

The present device is an adjustable planter disk for providing a false bottom within a planter. In some embodiments, the planter disk also provides a water reservoir within the bottom portion of a plant container for automatic watering of the plants supported by the planter disk. In general, the planter disk is constructed from a resin material in a circular shape having a first end that overlaps, or partially overlaps, a second end. The planter disk is constructed to include a plurality of sections connected with living hinges. In operation, the first end rotates over the top surface of the second end, flexing the living hinges to vary the outer diameter of the planter disk in order to create a disk insert for insertion within a variety of sizes of flower pots. Latches and/or catches are provided to allow the planter disk to be secured at the proper diameter. Along the peripheral edge of the planter disk is a rib. The rib creates a frictional contact point with the inside surface of a planter in order to provide a snug fit and structural integrity. In at least one embodiment, the center portion of the planter disk is raised. This construction causes the disk to expand in diameter slightly as weight on the planter disk is increased, reducing the tendency of the planter disk to slide down the inner surface of the planter. Additionally, along the peripheral edge of the circular disk are a plurality of water drainage/root growth apertures. These apertures allow excess water to drain into a reservoir created within the plant container and beneath the planter disk. The apertures also allow the roots of the plant(s) to grow through the apertures and into the water whereby water can be supplied to the plant(s) for extended periods. The planter disk may be used with planters of various sizes and shapes as small gaps around the periphery of the planter disc will not hamper its operation.

Accordingly, it is an objective of the present invention to provide a planter disk for supporting a plant above the bottom surface of a plant container.

It is another objective of the present invention to provide a planter disk that is reusable, durable, and adjustable to various sized and shaped flower pots.

It is a further objective of the present invention to provide a planter disk that controls water drainage within the planter to reduce the occurrence of root rot within the potted plants.

It is yet another objective of the present invention to provide a planter disk that reduces the amount of soil needed within a planter, reducing the weight of decorative planters.

It is a still further objective of the present invention to provide a planter disk that exposes plant roots to air, producing healthier plants and better growth.

Yet another objective of the present invention is to provide an adjustable planter disk that is reusable and constructed of a durable material.

Yet another objective of the instant invention is to provide an adjustable planter disk having a rib about the perimeter of the planter disk for strength and a snug fit around the interior surface of the planter.

Still yet another objective of the present invention is to provide a planter disk that includes a raised center portion whereby increasing the load upon the top surface of the planter disk causes the planter disk to engage the inner surface of the planter more firmly.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 4:
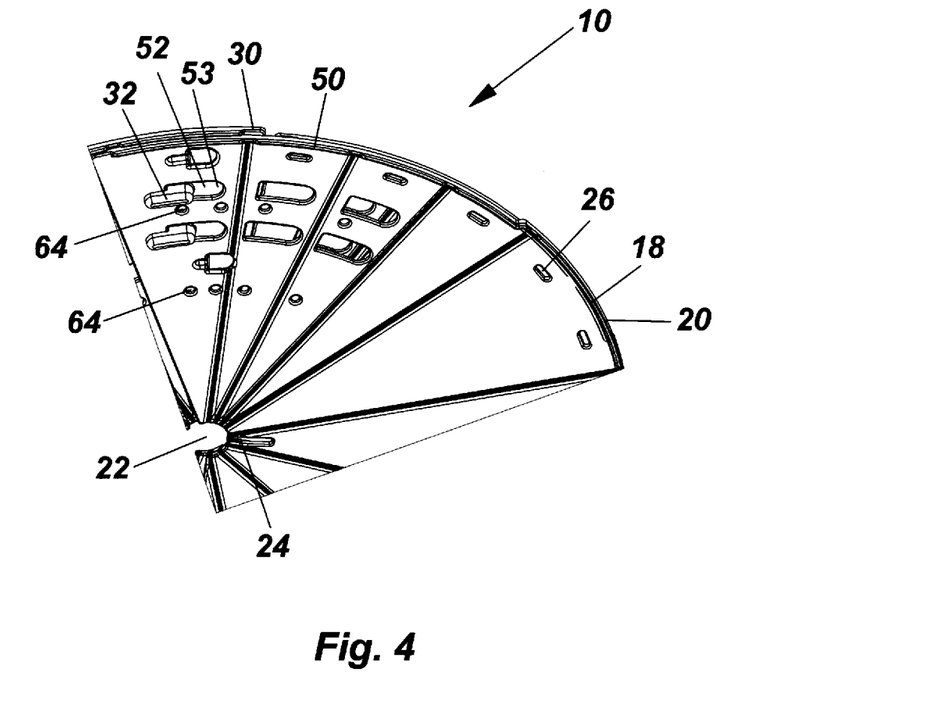
FIG. 4 is a partial perspective bottom view of the instant invention at a first radii.
Figure 5:
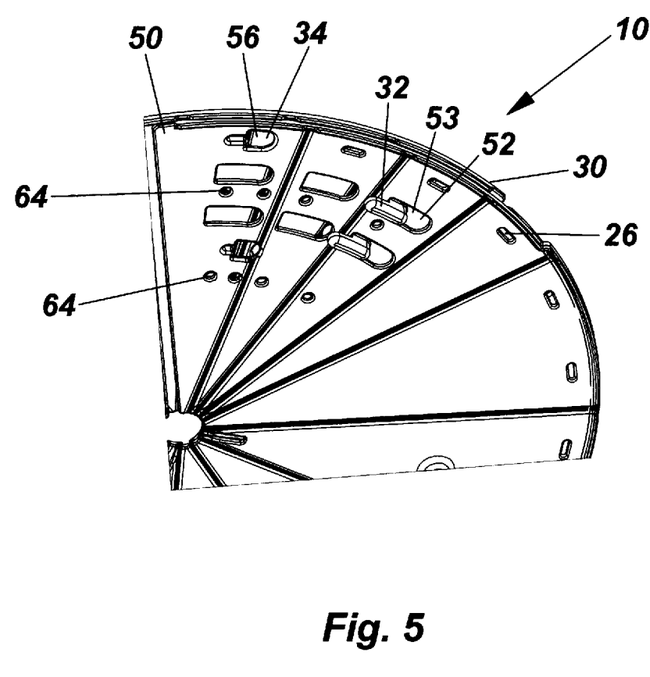
FIG. 5 is a partial perspective bottom view of the instant invention at a third radii.

Now referring to FIGS. 1-5, the adjustable planter disk insert 10 is a circular disk comprised of a single resin composite sheet 12 (referred to herein as sheet) having a first terminating end 30 that overlaps, or partially overlaps, a second terminating end 50, aptly shown in FIGS. 4 and 5. The sheet 12 includes a peripheral edge 18 and center hole 22. The first terminating end 30 rotates overtop the second terminating end 50 to create differing radii in order to create an adjustable planter disk insert 10 for insertion within a flower pot 2. The adjustable planter disk insert 10, therefore, has differing diameters which allows the user to choose the depth desired within the flower pot 2. This construction cuts down on soil use and creates less flower pot mass, thus saving added soil cost and manual effort to move the flower pot by raising the bottom of the container, providing for proper drainage and essential oxygen to access plant roots. Most plants have a short root base, requiring only 6-8 inches of soil to thrive. Thus, a large pot may be modified as needed to maintain an ideal root base. Modification of the pot to contain less soil means the roots will be confined, forcing the nutrients back into the plants, thereby producing healthier plants with larger blooms. To allow for this adjustability, the sheet 12 is divided into a plurality of sectors 14, each sector 14 including a living hinge 16 that runs from the peripheral edge 18 to the center 22. The living hinge 16 allows for the first terminating end 30 to overlap the second terminating end 50 to allow for differing radii, and thus diameters, for the adjustable planter disk insert 10. In the preferred embodiment, each terminating end 30, 50 includes a pair of hooks 32, 56 that communicate with a corresponding series of paired apertures 52, 34. The inner hooks 32 cooperate with first paired apertures 53, second paired apertures 54, and third paired apertures 55 positioned on the second terminating end 50. While outer hooks 56 cooperate with outer first paired apertures 35, outer second paired apertures 36, and outer third paired apertures 37. In the preferred embodiment, one set of the hooks are formed onto the first terminating end 30 while the other set of hooks are formed onto the second terminating end so that each set of hooks support a portion of the load when soil is placed onto the planter disk. This construction provides a robust construction for holding the plant and soil load while also providing adjustability of the planter disk diameter, whereby securing the inner and outer hooks into the first sets of paired apertures provides a first diameter, securing the inner and outer hooks into the second sets of paired apertures provides a second diameter, and so on. It should be noted that while only three sets of paired apertures are illustrated, any number of apertures may be utilized without departing from the scope of the invention. In at least one embodiment, the center hole 22 includes at least one cutout 24 to provide stress relief for changing the diameters of the planter disk 10. When the user pulls the first terminating end 30 overlapping the second terminating end 50 into a desired position corresponding to a desired radius, the living hinges 16 flex to alter the convex shape of the planter insert. When a smaller radius is desired, the ends are overlapped to a greater degree, increasing the convex shape of the planter insert; larger diameters reduce the convex shape within a given range for each size of planter insert. This construction allows the user to customize the planter insert for various pots or alter the height at which the planter disk rests within the pot. This construction also provides the advantage of slightly increasing the diameter of the planter disk under load to cause it to grip against the inner surface of the planter pot. This reduces the tendency of the disk to slip downwardly within the planter pot when soil and plants are added on top of the planter disk.

Along the peripheral edge 18 of circular disk 10 is a rib 20. The rib 20 creates a frictional contact point with the interior surface 4 of a planter 2 in order to provide a snug fit and structural integrity, more aptly shown in FIG. 1. When planter insert disk 10 is inserted into the planter 2, the rib 20 snugly wedges the disk 10 in place under its own weight. The interior surface 4 of the planter 2 is removably engaged with the rib 20 of the planter disk insert 10 to form a false bottom within the flower pot 2. Additionally, along the peripheral edge 18 of the circular disk are a plurality of water drainage holes 26. The plurality of water drainage holes 26 provide excellent drainage, thereby preventing root rot. Root rot is a condition of over watering, whereby the excess water prevents the roots from getting the air they need and causes the roots to decay.

Figure 1:
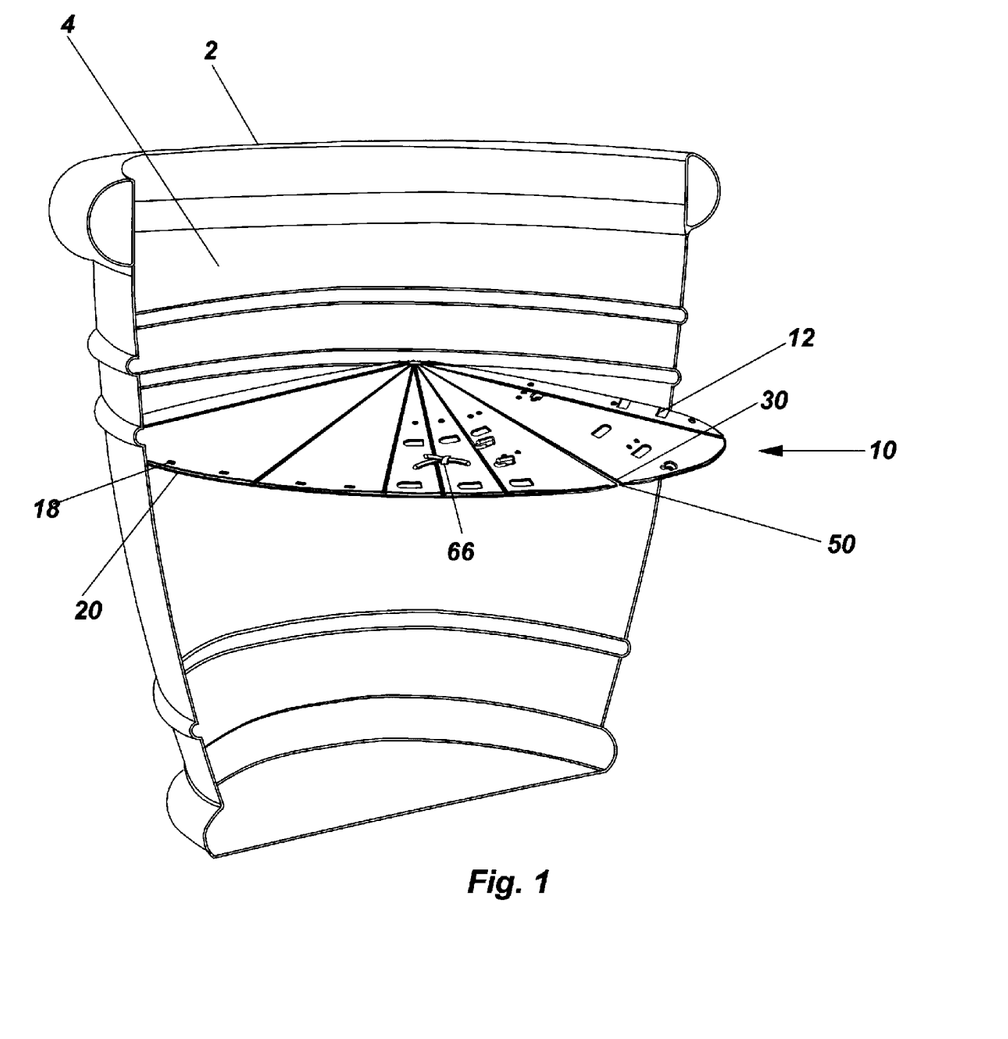
FIG. 1 is a cross-sectional view of a flower pot having an adjustable planter disk insert of the instant invention within.
Figure 2:
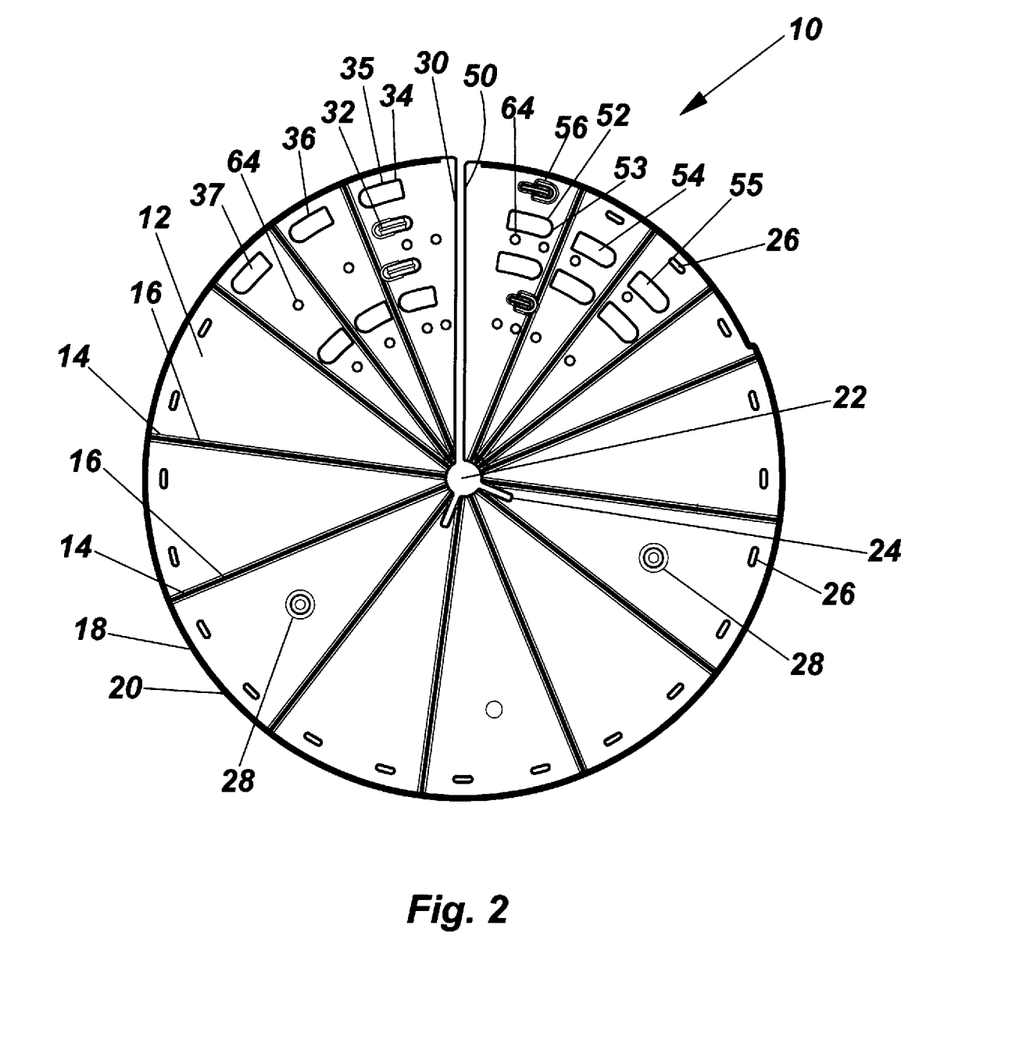
FIG. 2 is a top view of the instant invention.
Figure 3:
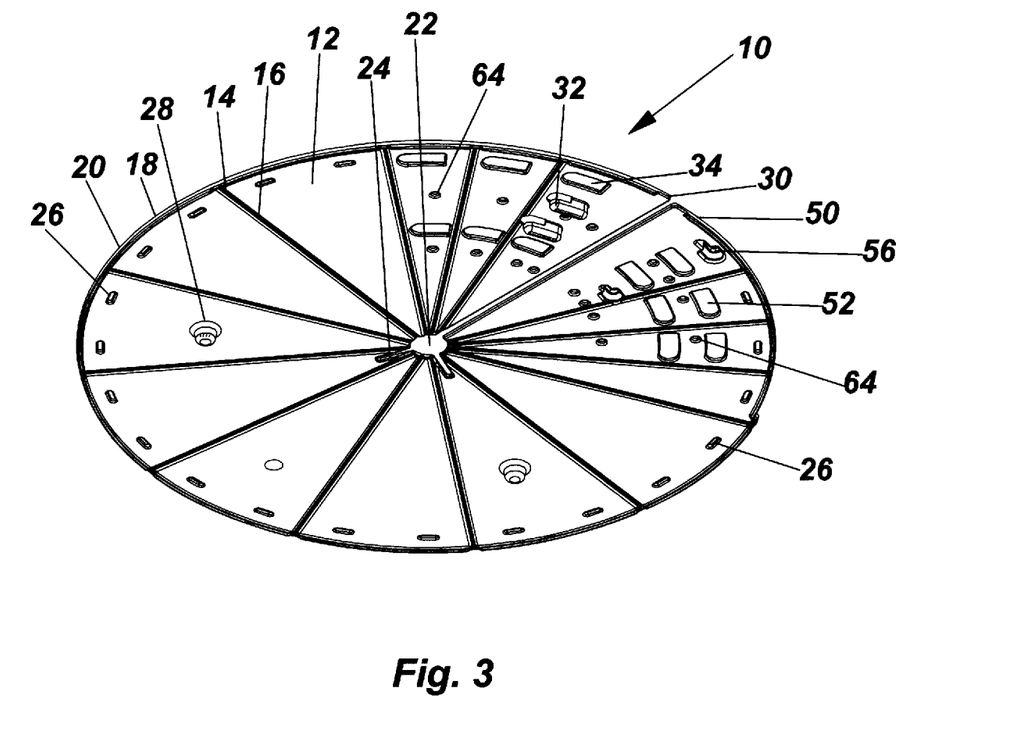
FIG. 3 is a perspective bottom view of the instant invention.

Furthermore, the adjustable planter disk 10 includes removal apertures 28. The removal apertures 28 are constructed and arranged to cooperate with a zip tie 66 or the like (FIG. 1). In operation, the zip tie straps are placed within the apertures 28 to enable a user to manually remove the disk insert 10 from engagement with the interior surface of the flower pot. A zip tie strap is fed through one aperture 28 and then looped through the adjacent aperture 28. Before placing the soil atop of the disk insert 10, each end of zip tie strap would be positioned in a superior position, relative to the disk 10, so that a user may grasp the zip tie to lift the disk insert 10 from engagement with the interior surface 4 of the flower pot 2.

The adjustable planter disk insert 10 also includes secondary latching hooks. The second terminating end 50 is comprised of a pair of secondary hooks 56 that communicate with a corresponding series of three pairs of holes 34 on the first terminating end 30. The pair of secondary hooks 56 latch within one of the pairs of holes 35, 36, and 37 on the first terminating end 30 in the same manner as the pair of hooks 32 on the first terminating end 30 latch within one of the pairs of holes 52 on the second terminating end 50, described above. The secondary hooks 56 and corresponding series of holes 34 provide another latching means to provide strength to the disk. Additionally, adjacent to each series of holes 34 and 52 on the first and second terminating end is a pair of reinforcement holes 64. The reinforcements holes 64 are contemplated for use with a zip tie, nut and bolt, rivet, push in plastic rivet, binding posts, or the like. The reinforcement holes 64 on the first terminating end 30 would overlap the reinforcement holes 64 on the second terminating end 50 whereby, by way of example, a zip tie can be looped therethrough to hold the first and second terminating ends in place. Alternatively, the reinforcement holes can be utilized by the plants within the container for root growth through the holes to the water supply below.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An adjustable planter disk for insertion within a plant container comprising:
    a circular disk of a sheet type material having a first terminating end that overlaps, or partially overlaps, a second terminating end said sheet type material being divided into a plurality of sectors, each said sector including an integrally formed living hinge to an adjacently positioned sector, said circular disk includes a peripheral edge and center point, said peripheral edge being constructed and arranged to cooperate with the internal surface of a plant container for supporting said planter disk above a bottom surface of said plant container; and
    at least one hook on said first terminating end that cooperates with a corresponding at least one aperture on said second terminating end for determining an outer radii of said peripheral edge of said adjustable planter disk wherein said planter disk includes a convex upper surface, whereby application of a load to said upper surface causes said outer radii to increase.

2. The adjustable planter disk of claim 1, including at least one pair of said at least one hooks and at least one pair of said at least one apertures, said at least one pair of hooks and said at least one pair of apertures sized and shaped for interlocking engagement therebetween.

3. The adjustable planter disk of claim 1, wherein said second terminating end includes a series of said pairs of apertures spaced apart and arranged to cooperate with said at least one pair of hooks for interlocking engagement therebetween, whereby engagement with each said at least one pair of apertures provides a different outer radii of said planter disk.

4. The adjustable planter disk of claim 3, wherein altering said outer radii of said planter disk alters the convexity of said planter disk.

5. The adjustable planter disk of claim 3, wherein said planter disk includes a central aperture.

6. The adjustable planter disk insert of claim 3, wherein said first terminating end of said planter disk includes at least one pair of secondary hooks that cooperate with a corresponding at least one pair of secondary apertures on said second terminating end for determining the outer radii of said adjustable planter disk.

7. The adjustable planter disk of claim 1, wherein said peripheral edge includes a rib thereabout, said rib constructed and arranged as a frictional contact point within an interior surface of said plant container.

8. The adjustable planter disk insert of claim 1, wherein said sheet type material is constructed of a resin material.

9. The adjustable planter disk insert of claim 1, including at least one pair of removal apertures, said at least one pair of removal apertures sized to cooperate with a zip tie for manual removal of the planter disk from the plant container.

* * * * *